UNITED STATES PATENT OFFICE.

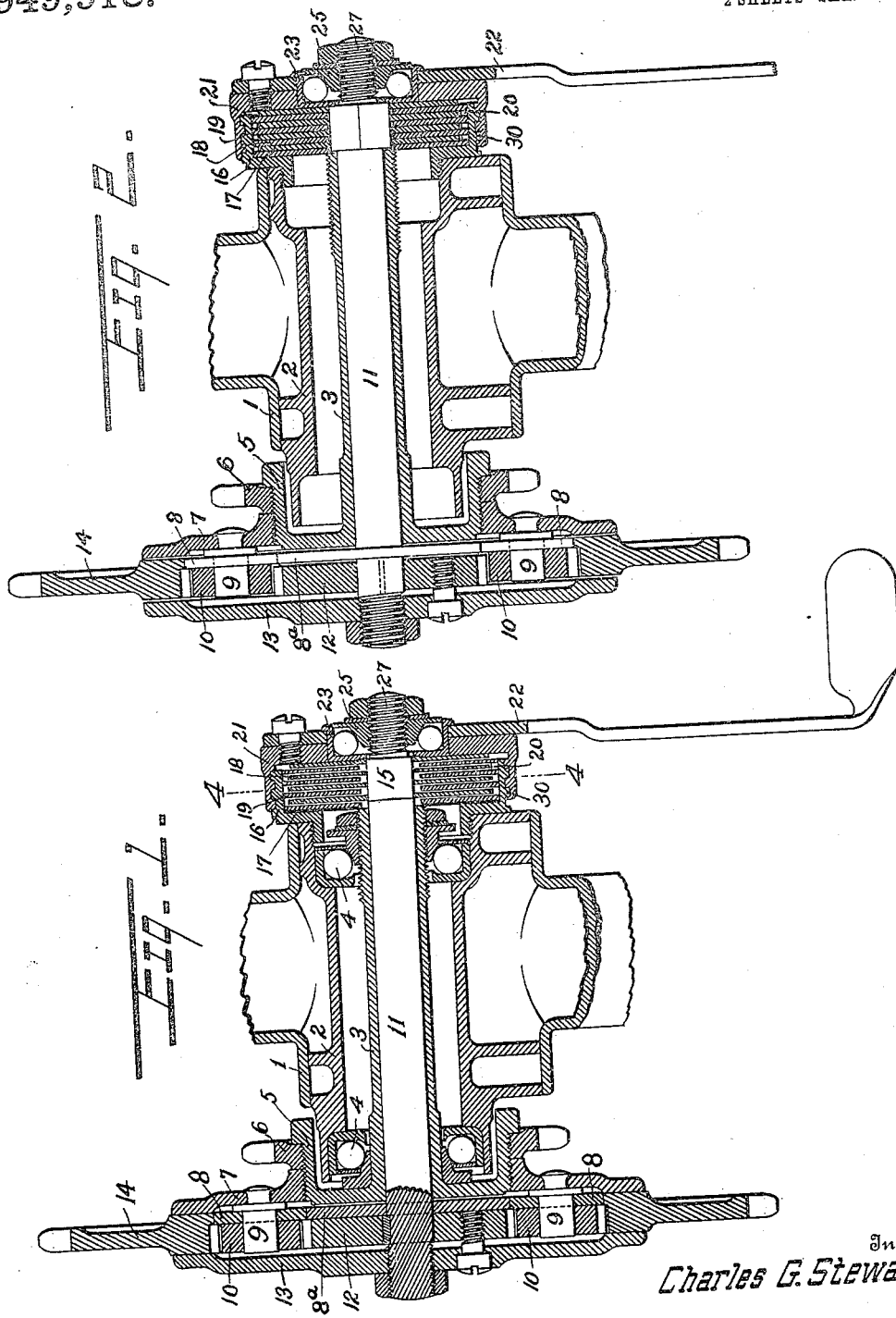

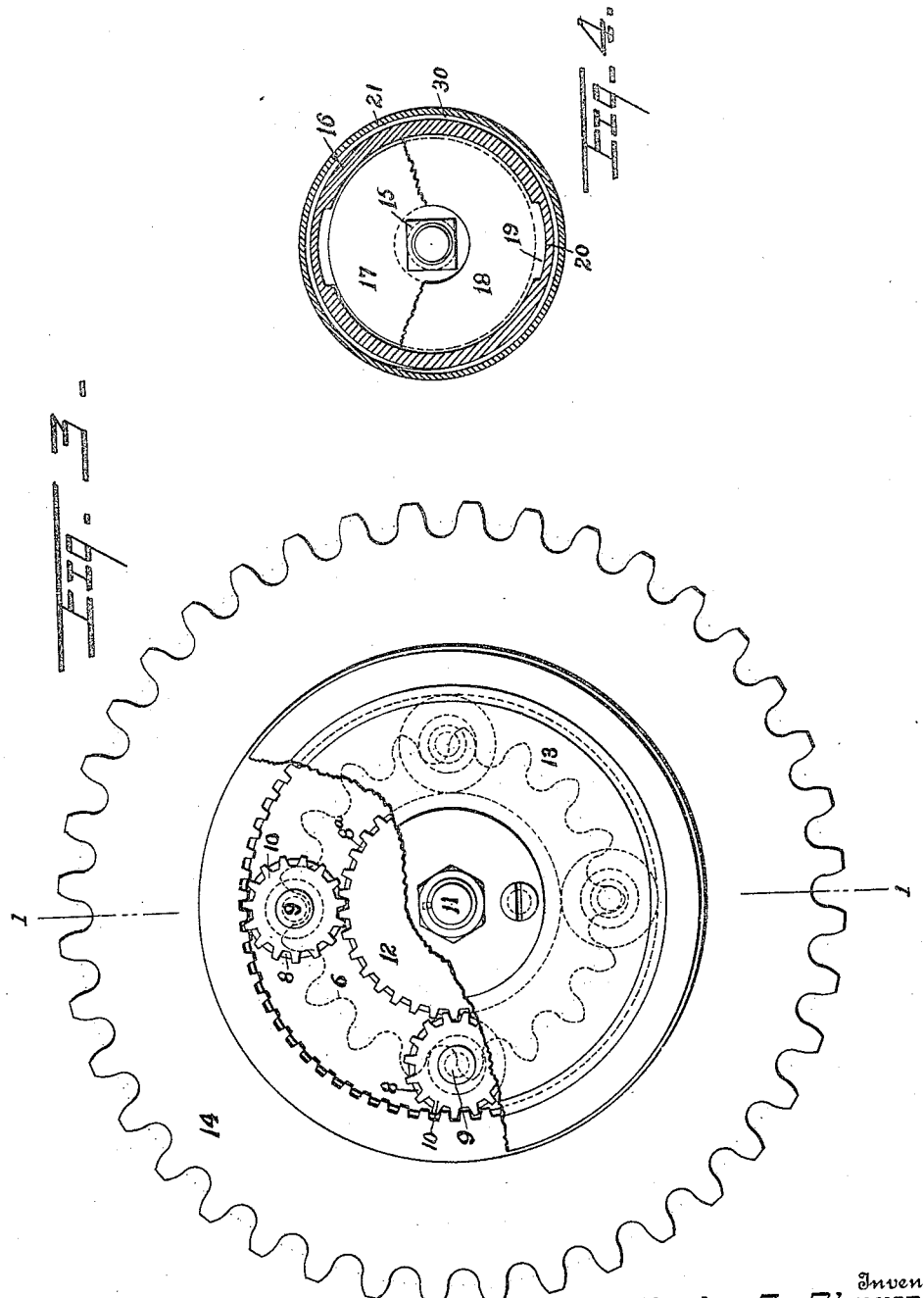

CHARLES GEORGE STEWART, OF TORRINGTON, CONNECTICUT, ASSIGNOR TO READING STANDARD COMPANY, OF READING, PENNSYLVANIA, A CORPORATION OF PENNSYLVANIA.

VARIABLE-SPEED GEAR.

949,918.  Specification of Letters Patent.  Patented Feb. 22, 1910.

Application filed May 16, 1908. Serial No. 433,200.

*To all whom it may concern:*

Be it known that I, CHARLES G. STEWART, a citizen of the United States, and a resident of Torrington, in the county of Litchfield and State of Connecticut, have invented certain new and useful Improvements in Variable-Speed Gear, of which the following is a specification.

My invention relates particularly to variable speed gears adapted for motor cycles and the like, and it consists in an improved construction comprising a drive member so combined with a driven member as to be caused either to directly or indirectly drive the latter or to run free thereof as determined by the operation of an axle-adjusting clutch mechanism, as fully described in connection with the accompanying drawings, the novel features being specifically pointed out in the claims.

Figure 1 is a longitudinal section, on the line 1—1 of Fig. 3, of a gear embodying my invention, the clamping plates being shown engaging the drive gear to rotate the driven gear directly therewith for high speed. Fig. 2 is a similar section, the drive gear being shown as indirectly driving the driven gear for slow speed. Fig. 3 is an end view, looking in the direction of the arrow 3, Fig. 1, a portion of the clamping plate being broken away to show the planetary gearing. Fig. 4 is a section on the line 4—4 of Fig. 1.

In the drawings 1 represents a frame hanger of a motor cycle or the like, and 2 a bearing, preferably eccentrically fixed therein as shown, and carrying a hollow hub 3, in ball bearings 4. On a cupped end portion 5 of said hollow hub is secured a gear 6, and a clamping plate 7; the latter carrying planet-roller rings 8 and planet-pinions 10 on studs 9. Rotatable within said hollow hub 3 is a longitudinally movable axle 11 having a sun-gear 12 and clamping plate 13 fixed to one end thereof. Between the outer portions of the clamping plates 7 and 13 is an internally-toothed drive gear 14, meshing with the planet gears 10. The opposite end of the axle 11 is formed with a portion 15 of angular cross-section projecting beyond the hollow hub 3 into a cupped extension 16 of the bearing 2. Within this extension 16 are friction disks 17 and 18, the disks 17 having angular openings engaging the angular portion 15 of the axle 11 and rotating therewith; and the disks 18 have circular openings for the passage of axle portion 15 and are provided with projections 19 engaged in slots 20 of the cupped extension 16 to secure them against rotation. An axle-adjusting nut 21, provided with an operating lever 22, engages a coarse-thread 30 on bearing extension 16 and acts on the friction disks 17 and 18 to securely clamp them together when desired to lock the axle 11 against rotation. A cup bearing 23, fixed in said nut 21, engages the shouldered angular portion 15 of axle 11 to push the latter forward with the nut 21 and friction disks; and a thrust collar 25 is provided on a screw-threaded end 27 of axle 11, against which said nut operates when retracted, to also retract the axle 11, together with its fixed clamping plate 13.

The operation is as follows: In Fig. 1 the axle-adjusting nut 21 has been turned by the operating lever 22 to free the friction disks 17 and 18, and to longitudinally move the axle 11 to draw its attached clamping plate 13 against gear 14 to clamp the latter to the driven gear 6 through the clamping plate 7, to directly drive said gear; the planetary gearing being locked, in this position, and the hub 3 and axle 11 rotating together, the released friction disks permitting the free rotation of said axle. In Fig. 2 the axle-adjusting nut 21 has been moved in a reverse direction to free the gear 14 and to lock the axle 11 against rotation by clamping together the friction disks 17 and 18. The gear 14 will now drive gear 6 indirectly at a slower speed through the planetary gearing; the sun gear being fixed to the clamped axle 11, the planet pinions will turn about the same, carrying the clamping plate 7 and gear 6 on the hub 3. When the nut 21 is turned to a position intermediate that shown and described in Figs. 1 and 2, the friction disks 11 and clamping plate 13 are both free to rotate. The gear 14 will then be in free engine or non-operative position, the sun gear 12 turning on the free axle 11, the gear 14 will idly turn the same. The planet rollers 8 are equal in diameter to the pitch-circles of the pinions, and the drive gear 14 is arranged, as shown, to ride thereon and thereby positively insuring proper meshing of the pinions with said drive gear; said rollers being also adapted, as shown, in connection with a similar roller 8ª concentric with the sun-gear 12, to insure proper meshing of the pinions with the latter.

It will thus be seen that my improved gear provides for two speeds and a free engine position. The lever 22 may be operated by any preferred means, though I have shown a foot lever. The construction is neat and compact, and the operation simple and satisfactory and practically noiseless.

What I claim is:—

1. A variable-speed gear for motor cycles or the like comprising a relatively fixed bearing, a driven-gear having a hollow-hub mounted in said bearing and a clamping-plate rotating therewith, planet-pinions carried by said plate, a drive-gear meshing with said pinions, an axle in said hollow-hub, a sun-gear and coacting clamping-plate mounted on said axle, and means for reversely moving said axle longitudinally to respectively connect or disconnect said drive-gear and driven-gear and simultaneously unlock or lock said axle to the fixed bearing substantially as set forth.

2. A variable-speed-and-free-engine gear for motor cycles or the like comprising a relatively fixed bearing, a driven-gear having a hollow-hub mounted in said bearing and a clamping-plate rotating therewith, planet-pinions carried by said plate, a drive-gear meshing with said pinions, an axle in said hollow-hub, a sun-gear and coacting clamping-plate mounted on said axle, and a clutch mechanism comprising an axle-adjusting nut on the end of said bearing and a series of friction-disks on said axle alternately rotatable and non-rotatable therewith and adapted to be engaged or disengaged by the operation of said nut.

3. In a variable-speed gear for motor cycles and the like, the combination with the relatively fixed bearing, the driven-gear having a hollow-hub mounted in said bearing, the independently rotatable drive-gear therefor, and clamping means for said gears of the longitudinally movable axle in said hollow-hub arranged to engage and disengage said driven and drive-gears and having an angular-section portion and an adjacent thrust-collar, the series of alternately rotary and non-rotary friction-disks upon said angular-section axle portion, and the axle-adjusting nut adapted to frictionally engage or disengage said disks, substantially as set forth.

4. In a variable-speed gear the combination with an internally toothed drive-gear, a hollow-hub provided with a driven-gear, and means for clamping together and releasing said gears, of planet-pinions carried by said driven-gear and meshing with said internally toothed drive-gear, an axle in said hollow-hub provided with a sun-gear, clamping means for said sun-gear and rollers concentric with and corresponding in diameter with the pitch-circles of said pinions whereby proper meshing of said pinions is insured, substantially as set forth.

In testimony whereof, I affix my signature, in the presence of two witnesses.

CHARLES GEORGE STEWART.

Witnesses:
JOHN M. WADHAMS,
N. H. MORRISON.